United States Patent [19]

Ding

[11] Patent Number: 5,087,374
[45] Date of Patent: Feb. 11, 1992

[54] REMOVAL OF CONTAMINATES FROM GRANULAR SOLIDS

[76] Inventor: Lambert L. Ding, 1920 Calle Bogota, Rowland Heights, Calif. 91748

[21] Appl. No.: 488,092

[22] Filed: Mar. 5, 1990

[51] Int. Cl.$^5$ .............................................. C02F 1/28
[52] U.S. Cl. ...................................... 210/673; 134/1; 134/25.1; 210/694; 502/23
[58] Field of Search ................... 134/1, 25.1; 210/670, 210/673, 694; 502/20, 23, 38

[56] References Cited

U.S. PATENT DOCUMENTS

| | | | |
|---|---|---|---|
| 4,261,805 | 4/1981 | Galliker et al. | 204/157.44 |
| 4,595,509 | 6/1986 | Fox et al. | 210/673 |
| 4,861,484 | 8/1989 | Lichtin et al. | 502/29 |

Primary Examiner—Ivars Cintins
Attorney, Agent, or Firm—Plante, Strauss, Vanderburgh & Connors

[57] ABSTRACT

There is disclosed a method for the removal of impurities, particularly organic impurities from granular solids, having its greatest immediate application for the regeneration of spent adsorbents which are used to purify waste water. The spent activated carbon is immersed in an aqueous bath which preferably contains a surface active agent, and water is circulated over the activated carbon while ultrasonic vibration is applied to the aqueous bath at a frequency from about 1 to about 100 kHz to desorb the organic adsorbate from the activated carbon. The desorbed organic compounds are washed from the activated carbon by the circulating water stream and are decomposed by introducing ozone into the water stream and, most preferably, while subjecting the water stream to ultraviolet radiation, thereby producing a wash water which can be safely discharged to the environment.

19 Claims, 1 Drawing Sheet

REMOVAL OF CONTAMINATES FROM GRANULAR SOLIDS

BACKGROUND OF THE INVENTION

1. Field of Invention

This invention relates to a method for the removal of contaminates from granular solids and, in particular, to the regeneration of activated carbon used for adsorption of organic impurities from waste water.

2. Brief Description of the Prior Art

A commonly experienced problem is the contamination of granular solids with impurities, particularly organic impurities. The problem is encountered when soils become contaminated by spills of industrial chemicals and when waste industrial chemicals have been indiscriminately been discharged to waste sites. An efficient method is required for regeneration of the contaminated soil.

The problem also occurs in the contemporary industrial practice of treatment of waste water with solid adsorbents—predominately activated carbon—to adsorb organic impurities from the water, prior to discharging the water to the environment.

The adsorption of organic compounds on granular solids, such as the clay and loam of soils, and on other industrial adsorbents such as clays, silicas, activated carbon, etc., is a physical phenomenon; organic compounds are attracted by Van Der Waals forces and become physically attached to the surfaces of the granular solids.

The solid adsorbents which are used to purify waste water become spent when organic compounds are adsorbed on the surfaces of the solids, and the spent adsorbents must be discarded or regenerated. Regeneration of activated carbon is practiced only in limited applications, and the majority of spent activated carbon is trucked to secluded waste disposal sites. The same disposal is practiced with soils which have become contaminated with organic impurities.

The most commonly used regeneration for activated carbon has been thermal desorption in which the activated carbon is placed in a retort and heated to elevated temperatures, typically about 1000 degrees C. While this treatment effectively regenerates the activated carbon, it is quite costly in initial investment and operation. Additionally, the operation of the waste water treatment plant must be interrupted to remove the spent adsorbent from the adsorption vessel to transport the adsorbent to a remote location for the thermal desorption. Because of the high capital investment and operating costs experienced in thermal regeneration of activated carbon, most of the activated carbon used to treat waste water is discarded in hazardous disposal sites.

Disposal of contaminated soil, or spent adsorbents such as activated carbon at hazardous disposal sites is not, however, environmentally acceptable, particularly in view of the decreasing availability of suitable land sites for disposal, and public sentiments.

Other techniques for regeneration of activated carbon which have been attempted include vacuum and solvent purging wherein the spent adsorbent is subjected to reduced pressures and/or contact with organic solvents. Another technique which has been used is adsorbent displacement by contacting the spent adsorbent with another adsorbent.

Of the aforementioned treatments, the thermal regeneration is most widely practiced, however, the vast majority of spent activated carbon is disposed without regeneration.

There have been suggestions in the prior art that ozone can be used for gas phase oxidization regeneration of activated carbon, e.g., see Japanese Patent Application 76-140713 and German Democratic Republic Patent DD237,116. Ozone has also been used for regeneration of cuprous sulfate impregnated activated carbon as disclosed in Japanese Application 74-379185 and 78-114904.

Ultrasonic vibration has been applied for the regeneration of chromous-cupric adsorbent; see *Przem, Chem.* 62(9), p 518 (1983). Ultrasonic treatment has also been suggested as an aid in ion exchange regeneration in French Patent 2093541.

Heretofore, there has been no technique practiced for the regeneration of spent activated carbon adsorbent that would economically remove organic adsorbate in an efficient manner which could eliminate all potential environmental objections.

OBJECTIONS OF THE INVENTION

It is an object of this invention to provide a method for regenerating spent activated carbon adsorbent.

It is also an object of this invention to provide a regeneration method for removing and decomposing organic adsorbate from a spent activated carbon adsorbent.

It is an additional object of this invention to provide a regeneration method for spent activated carbon which has low capital investment and low energy requirements.

It is also a further object of this invention to provide a method for regeneration of spent activated carbon adsorbent that has little or no emission of environmentally objectionable materials.

It is an additional object of this invention to provide a method for the regeneration of activated carbon which can be practiced with little or no exposure to industrial hazards.

Other and related objects will be apparent from the following description of the invention.

BRIEF DESCRIPTION OF THE INVENTION

This invention comprises a method for the removal of impurities, particularly organic impurities from granular solids. Although it can be applied to treatment of contaminated soil, it has the greatest immediate application for the regeneration of spent adsorbents which are used to purify waste water. In such applications, it is particularly well suited to the regeneration of spent activated carbon, i.e., carbon containing organic adsorbate resulting from the adsorption of organic contaminates in waste water and the like.

In the method of this invention, the spent activated carbon is immersed in an aqueous bath, and water is circulated over the activated carbon while ultrasonic vibration is applied to the aqueous bath at a frequency from about 1 to about 100 kilo-Hertz (kHz), sufficient to effect a substantial desorption of the organic adsorbate from the activated carbon. Preferably a surface active agent is added to the treatment water at a concentration from 20 to about 250 ppm. Most preferably, a biodegradable surface active agent is used. The desorbed organic compounds are washed from the activated carbon by the circulating water stream. Preferably the desorbed organic compounds are decomposed by introducing ozone into the water stream and, most preferably, while subjecting the water stream to ultraviolet radiation, thereby effecting the decomposition of the organic compounds, and producing a wash water which can be safely discharged to the environment.

BRIEF DESCRIPTION OF THE DRAWINGS

The invention will be described with reference to FIGS. 1 and 2, which are flow diagrams for the process of the invention.

DESCRIPTION OF THE PREFERRED EMBODIMENTS

This invention comprises a method for the regeneration of spent activated carbon which contains adsorbed organic molecules. The activated carbon is typically obtained from the treatment of waste water that contains organic contaminants such as aliphatic and aromatic hydrocarbons, e.g., benzene, toluene, xylene, naphtha, kerosine, etc., halogenated compounds such as methylene chloride, Freon ®, etc. In this treatment, the waste water is filtered through a packed bed of activated carbon granules, usually having sizes from 0.05 to about 0.25 inch average diameter.

The organic compounds are adsorbed on the surfaces of the activated carbon by physical, Van Der Waals forces. In most applications the activated carbon becomes spent when a sufficient quantity of organic compounds have been adsorbed thereon, and the presence of the organic compounds can be detected in the treated effluent from the treatment plant.

Figure 1:
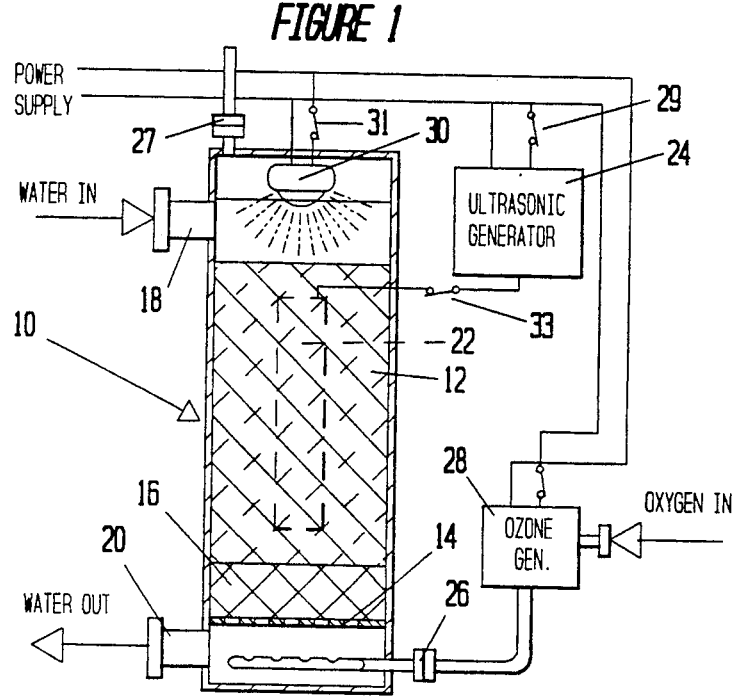

The activated carbon is regenerated in accordance with this invention by applying ultrasonic vibration to an aqueous bath containing the spent activated carbon particles. FIG. 1 illustrates a treatment vessel 10 for this purpose. The vessel 10 (which can be the same vessel used for the purification of waste water), contains a packed bed 12 of granular activated carbon particles resting on a foraminous grid 14. The activated carbon can rest on a layer 16 of inert solids, e.g., gravel and the like.

Typically, the vessel has nozzles 18 and 20 at opposite ends for introduction and removal of a water stream. During the regeneration, water is passed through the activated carbon. When the treatment is performed in the same vessel as used for purification of waste water, the water is preferably passed counter-current to the direction of the water during purification, i.e., as a back flush.

In FIG. 1, the water is introduced through a top nozzle 18 of the vessel and is passed vertically through the activated carbon bed and removed from the lower extremity of the vessel through nozzle 20. An ultrasonic probe 22, which can be a tubular member, is preferably centrally located within the bed 12 of the activated carbon. Ultrasonic vibration is applied to this probe using a conventional ultrasonic generator 24 which has a sufficient power rating for the application of ultrasonic vibrations to the carbon bed 12. The ultrasonic vibration is applied at a frequency in the range from 1 to about 100 kHz.

The treatment is conducted at ambient to slightly elevated temperatures, e.g., from 25° C. to about 100° C. The water will be heated by the application of the ultrasonic vibration, and this heating will be sufficient to maintain the aforementioned temperature. If desired, however, a resistance heater, or indirect heat exchange with a heating fluid can be practiced, however, such heating is not required in the treatment.

A source of oxygen is also introduced into the vessel through an inlet nozzle 26. Preferably the oxygen source is air. The oxygen containing gas, either air or a mixture of oxygen with an inert gas, is passed over an ozone generator 28, which, again, is a conventional generator to which electrical energy is supplied in sufficient quantities to generate ozone in the airstream, typically providing a concentration of ozone in the air stream between about 0.1 and 5 percent. The air is introduced into the vessel and percolated through the liquid bath within the vessel at a rate sufficient to provide a concentration of ozone within the vessel of about approximately 0.5 to 2 weight percent. Excess treating gas, i.e., excess air, is removed from the vessel through nozzle 27 and exhausted to the atmosphere. This exhausted air stream will also contain combustion products, chiefly carbon dioxide from the oxidation of the organic compounds, and will be saturated with water vapor.

Preferably ultraviolet radiation is applied to the interior of the vessel. This can be achieved by locating one or more ultraviolet light sources 30 within the vessel 10. In the illustrated embodiment, an ultraviolet light source 32 is shown in the vapor space within the vessel, obtaining its power from the line power source through switch 31. Alternatively the ultraviolet light source 32 could be immersed beneath the liquid level within the vessel. The light source 32 can have an emission wavelength in the near ultra-violet and the ultra-violet range, e.g., from 100 to about 3900 Angstroms.

The regeneration is maintained for a sufficient length of time to desorb the organic compounds from the activated carbon and restore the activated carbon to substantially its initial activity. Typically this requires a treatment time from about 0.5 to 8 hours, depending on the concentration of the organic contaminates on the solids.

Figure 2:
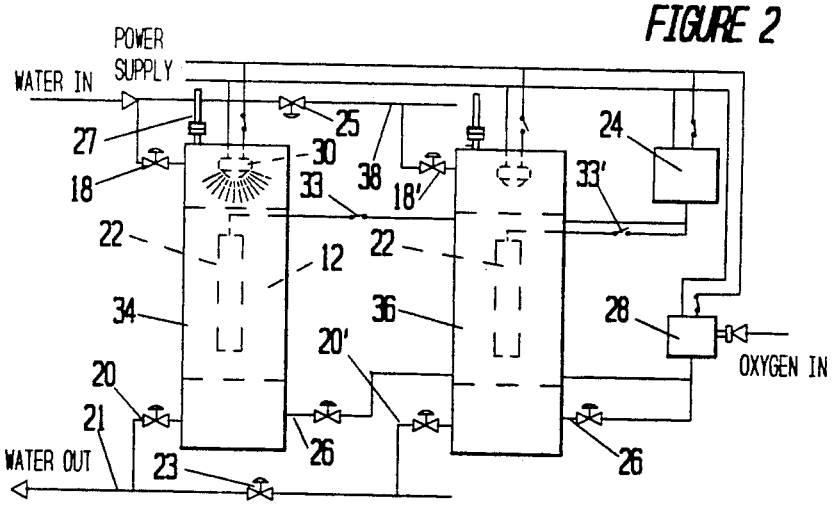

In a typical waste water purification application such as illustrated by FIG. 2, two or more vessels 34 and 36 are provided and are connected in parallel. The flow of water through the vessels is alternated, batchwise, between treatment of the water for purification and regeneration of the spent carbon. The waste water undergoing purification is introduced through a flow directing header 38 from where it is manifolded to one or more of the treatment vessels by selective opening and closing of valves 25, 18 and 18'. The purified, effluent water is withdrawn from the treatment vessel 36. When objectionable quantities of organic compounds are detected in the effluent, the waste water is diverted to a freshly regenerated bed of adsorbent in the other vessel. In the illustration, vessel 34 is being treated in accordance with the invention and the vibration drive signal is supplied from the generator 24 to the ultrasonic probe 22 within vessel 34. Ultraviolet radiation is supplied by source 30 within vessel 34, and air is passed thorough the ozone generator 28 and introduced into vessel 34. Excess air and combustion products are vented from vessel 34 though line 27. During the regeneration treatment in vessel 34, water is continued to be purified by passage over the activated carbon bed 12 of solids in vessel 36. During the purification treatment of the waste water in vessel 36, the spent adsorbent contained within vessel 34 is completely regenerated by practicing the regeneration method of this invention so that when the bed of adsorbent 12 within vessel 36 is spent, the water can be diverted to vessel 34. The manifolds 21 and 38, and respective valves 23 and 25, and the valves 18, 18', 20 and 20' (located at the treatment vessels) enable the operator to direct water flow independently, in either direction, i.e., upflow or downflow, through the vessels 34 and 36, during the water treatment and solids regeneration operations.

In this application, there is no necessity to remove or transport any of the spent activated carbon but instead, the operation within the vessels 34 and 36 is alternated between water purification and activated carbon regeneration.

The regeneration treatment achieves decomposition of the organic compounds and the back flush water which is passed through the activated carbon bed during regeneration can be reused or can be disposed of in municipal drains without any introduction of any hazardous material into the environment.

The following example will illustrate the practice of the invention and demonstrate results obtainable thereby.

EXAMPLE

A laboratory investigation of the treatment method is practiced. Spent activated carbon is prepared by placing 300 grams of activated carbon in a one-gallon vessel and contacting the carbon therein with contaminated waste water. The contaminated waste water is prepared which contains 1,000 ppm of oil grease, 1,000 ppm of methylene chloride and 1,000 ppm of volatile hydrocarbons such as trichloroethleyne, PCE, benzene, toluene, xylene, and ethyl benzene. One-half gallon of this contaminated water is introduced into the one-gallon vessel with the activated carbon and mixed thoroughly. The water is left in the vessel with the actuated carbon for twenty-four hours to insure complete depletion of the adsorption capacity of the carbon.

The depletion of the activity of the activated carbon is monitored by withdrawing samples of the water and analyzing the samples using gas chromatography to detect when the activated carbon shows no further adsorption of the contaminants.

The spent activated carbon is then removed and filtered and divided into four batches of 500 grams each. The first sample is placed in a regeneration vessel having a probe for the application of ultrasonic vibration, an inlet for the introduction of ozone and an ultraviolet light source. The vessel is also provided with inlet and outlet nozzles to permit flushing of the carbon within the vessel with a stream of distilled water.

In the treatment of the first sample, ultrasonic vibration, ozone and ultraviolet radiation are applied while the activated carbon is back washed with distilled water for two hours. The regenerated activated carbon is then drained, rinsed with distilled water and filtered.

The second sample of the spent activated carbon is placed in the regeneration flask with 500 milliliters of distilled water and ozone and ultraviolet radiation are applied for two hours. The treated carbon is then rinsed with distilled water and filtered.

The third sample is placed in the treatment vessel with 500 milliliters of distilled water and ultrasonic vibration is applied for two hours. The treated carbon is then rinsed with distilled water and filtered.

The fourth sample is retained as an untreated sample for subsequent comparative testing.

Each of the four carbon samples is placed in a marked flask and 1,000 milliliters of the waste water containing the aforementioned contaminants are introduced into each of the four flasks. The resulting mixtures are stirred and permitted to stand for twenty-four hours in the laboratory. Thereafter a five milliliter sample is taken of the supernatant liquid in each flask. The samples are injected into a purge and trap gas chromatograph to analyze the concentration of contaminants in the samples. The following results are obtained:

TABLE

| Sample | Influent PPM | Effluent PPM |
| --- | --- | --- |
| 1 | 3,000 | 110 |
| 2 | 3,000 | 500 |
| 3 | 3,000 | 700 |
| 4 (Untreated) | 3,000 | 2500 |

From a comparison of the total quantity of organic contaminates in the effluents, it is observed that the activated carbon which was regenerated with ultrasonic vibration, ozone and ultraviolet light radiation has been effectively restored to its initial activity. In contrast, the treatment with ultraviolet light and ozone alone affected some but not complete regeneration of the spent carbon. Similarly the ultrasonic vibration alone was ineffective in completely restoring the activity of the activated carbon.

The invention has been described with reference to the illustrated and presently preferred embodiment. It is not intended that the invention be unduly limited by this disclosure of the presently preferred embodiment. Instead, it is intended that the invention be defined, by the steps and materials, and their obvious equivalents, set forth in the following claims:

What is claimed is:

1. The method of regenerating granular solids containing organic adsorbate which comprises:
  a. immersing said granular solids in an aqueous liquid bath;
  b. applying ultraviolet radiation having a wavelength from about 100 to about 3900 Angstroms to said aqueous liquid bath and to said granular solids contained therein;
  c. applying ultrasonic vibration at a frequency from 1 to about 100 kilo-Hertz to said aqueous liquid bath and to said granular solids contained therein, said vibration being sufficient to effect a substantial desorption of said organic adsorbate from said granular solids;
  d. introducing water into said aqueous liquid bath and withdrawing aqueous liquid therefrom to effect washing of said granular solids and removal of desorbed organic compounds therefrom; and
  d. introducing ozone into said aqueous liquid bath to oxidize said organic compounds.

2. The method of claim 1 wherein said granular solids are activated carbon adsorbent.

3. The method of claim 2 wherein said activated carbon adsorbent comprises a packed bed of granules of activated carbon, and said aqueous liquid bath is obtained by flooding said bed with water.

4. The method of claim 1 wherein said ultrasonic vibration is applied to said aqueous liquid bath by immersing a probe into said bath and vibrating said probe at said ultrasonic frequency.

5. The method of claim 1 wherein said bath is maintained at a temperature from 25° C. to 100° C.

6. The method of claim 5 wherein said temperature is maintained by said application of ultrasonic vibration to said aqueous liquid bath.

7. The method of claim 1 wherein said ozone is introduced into said aqueous liquid bath by the step of passing air through an ozone generation treatment to form an air and ozone gas stream and introducing said air and ozone gas stream into said aqueous liquid bath.

8. The method of claim 7 wherein said air and ozone gas stream is passed concurrently through said bed with said water.

9. The method of claim 1 wherein said ultraviolet radiation is applied to a water stream exiting from contact with said granular solids.

10. The method of regenerating activated carbon adsorbent containing organic adsorbate which comprises:
   a. immersing said activated carbon in an aqueous liquid bath;
   b. applying ultrasonic vibration to said aqueous liquid bath and to said activated carbon adsorbent contained therein at a frequency from 1 to about 100 kilo-Hertz, said vibration being sufficient to effect a substantial desorption of said organic adsorbate from said activated carbon adsorbent;
   c. introducing water into said aqueous liquid bath and withdrawing aqueous liquid therefrom to effect washing of said granular solids and removal of desorbed organic compounds therefrom; and
   g. adding a surface active agent to said aqueous liquid bath at a concentration from about 10 to about 250 parts per million.

11. In a method of the removal of organic compounds from water which comprises:
   d. contacting said water with activated carbon in an amount sufficient to adsorb said organic compounds from said water and form an organic-compound adsorbate laden activated carbon; and
   e. regenerating organic-compound adsorbate-laden activated carbon adsorbent containing organic adsorbate by:
      (1) immersing said activated carbon in an aqueous liquid bath containing from 10 to about 250 parts per million of a surface active agent;
      (2) applying ultrasonic vibration to said aqueous liquid bath and to said activated carbon contained therein at a frequency from 1 to about 100 kilo-Hertz, said vibration being sufficient to effect a substantial desorption of said organic adsorbate from said activated carbon; and
      (3) introducing water into said aqueous liquid bath and withdrawing aqueous liquid therefrom to effect washing of said activated carbon and removal of desorbed organic compounds therefrom.

12. The method of claim 11 wherein said ultrasonic vibration is applied to said aqueous bath by immersing a probe into said bath and vibrating said probe at said ultrasonic frequency.

13. The method of claim 11 wherein said bath is maintained at a temperature from 25° C. to 100° C.

14. The method of claim 11 wherein said activated carbon adsorbent comprises a packed bed of granules of activated carbon, and said aqueous bath is obtained by flooding said bed with water.

15. The method of claim 11 including the step of introducing ozone into said aqueous liquid bath to oxidize said organic compounds.

16. The method of claim 15 including the step of passing oxygen through an ozone generation treatment thereby producing ozone; and introducing said ozone into said aqueous liquid bath.

17. The method of claim 15 wherein said ozone is passed concurrently through said bed with said water.

18. The method of claim 15 including the step of applying ultraviolet radiation having a wavelength from about 100 to about 3900 Angstroms to said aqueous liquid bath.

19. The method of claim 18 wherein said ultraviolet radiation is applied to a water stream exiting from contact with said activated carbon.

* * * * *